United States Patent [19]

Shekhawat et al.

[11] Patent Number: 5,339,235
[45] Date of Patent: Aug. 16, 1994

[54] FAULT COMPENSATING MULTI-STEP WAVE INVERTER

[75] Inventors: Sampat Shekhawat, Tinton Falls; Robert C. Eckenfelder, Point Pleasant; John J. Tumpey, Oakhurst; Alfred W. Wohlberg, Neptune; Kapal Gandikota, Atlantic Highlands, all of N.J.

[73] Assignee: AlliedSignal Inc., Morris Township, Morris County, N.J.

[21] Appl. No.: 60,286

[22] Filed: May 11, 1993

[51] Int. Cl.$^5$ .............................................. H02M 1/12
[52] U.S. Cl. ........................................ 363/43; 363/58; 322/10
[58] Field of Search ............... 363/43, 56, 58; 361/18, 361/90, 92; 322/10

[56] References Cited

U.S. PATENT DOCUMENTS

| | | | |
|---|---|---|---|
| 3,638,094 | 1/1972 | VeNard, II | 321/5 |
| 3,775,662 | 11/1973 | Compoly et al. | 321/5 |
| 4,554,501 | 11/1985 | Baker | 322/29 |
| 4,750,098 | 6/1988 | Heinrich et al. | 363/10 |
| 5,040,105 | 8/1991 | Dhyanchand et al. | 363/43 |
| 5,138,544 | 8/1992 | Jessee | 363/43 |
| 5,177,460 | 1/1993 | Dhyanchand et al. | 363/43 |
| 5,239,454 | 8/1993 | Dhyanchand et al. | 363/43 |

Primary Examiner—Steven L. Stephan
Assistant Examiner—Matthew Nguyen
Attorney, Agent, or Firm—Verne E. Kreger, Jr.

[57] ABSTRACT

A multi-step, alternating current power supply that provides for a failed-operation redundancy safety system that compensates for a short-circuited power switch and maintains an AC regulated output voltage without introducing undesirable harmonic components. The firing and logic controller 33 senses a short-circuited power switch 46 within an inverter bridge 32 and disables all complementary power switches 48 within the faulted bridge and enables the remaining power switches 50 in the faulted bridge. The firing sequence is adjusted for the remaining healthy power switches 52 by increasing the phase shift of the individual waveforms 54. The generator voltage is increased as required to maintain the desired AC voltage output level 56.

14 Claims, 6 Drawing Sheets

5,339,235

FAULT COMPENSATING MULTI-STEP WAVE INVERTER

FIELD OF THE INVENTION

This invention relates in general to inverter systems for AC power generation which incorporate static electrical power conversion elements and, more particularly, to a 24 or a 36-step wave inverter system that compensates for a faulted inverter bridge circuit.

BACKGROUND OF THE INVENTION

This invention is particularly applicable to aviation electrical power generation requirements that rely on state of the art electronic features, such as variable speed, constant frequency ("VSCF") electrical power generators used aboard military and commercial aircraft. However, it will be appreciated that this invention has broader applications wherever it is needed to provide a single phase or a multiple phase regulated voltage output from a static inverter. Such applications include industrial drives, power conditioning equipment, and the generation of controllable leading or lagging reactive current.

Each VSCF generator unit aboard an aircraft includes a three-phase power inverter paired with a propulsion engine so that each engine can be used to help fulfill the requirement of system redundancy to enhance operational safety. The aircraft's electrical power requirement is normally supplied by either a 24 or a 36-step wave inverter which provides from 20 to 50 kilovoltamps (KVA), three-phase, 115 VAC, operating at 400 Hz. As is known in the art, a 24-step wave inverter comprises, four, three-phase inverter bridges, and a 36-step wave inverter comprises six, three-phased inverter bridges. Each inverter bridge comprises six semiconductor power switching devices such as Gate Turn-Off (GTO) Thyristors, Insulated Gate Bipolar Transistor Pairs (IGBT), MOS-Controlled Thyristors (MCT) or other static switching devices. Each power switch is arranged and properly timed to provide three-phase AC voltages from a DC supply. The outputs of a equal number of inverter bridges are connected to the primary of an output transformer in either a delta or wye configuration. The secondary windings of the output transformers are interconnected in a series-add configuration which provide a multi-step waveform as discussed in U.S. Pat. No. 3,638,094.

A problem with the current design of VSCFs is that when a power switch in an inverter bridge develops a short circuit, the VSCF shuts off, and no AC power is delivered to the AC output bus. When this occurs, an auxiliary back-up power system on the aircraft switches on line to provide the necessary emergency electrical power for the aircraft to land safely. This back-up power system provides, what is commonly known in the industry as, fail-safe (FS) operation. However, no VSCF system currently provides a failed-operation (FO) redundancy safety system.

SUMMARY OF THE INVENTION

In accordance with the present invention, there is provided an improved multi-step alternating current power supply that provides for a failed-operation, redundancy safety system that compensates for a short-circuited power switch in order to maintain an AC regulated output voltage without introducing undesirable harmonic components.

The invention comprises:
an electrical generator electrically connected to rectifying means for producing a DC voltage;
a. regulating means to regulate said DC voltage at alternative voltage levels by controlling the output of said generator; and
b. an inverter for converting said DC voltage to an AC voltage, said inverter comprising:
 i. a multiple pair of inverter bridges, with each bridge having at least one pair of unidirectional conducting semiconductor switches, wherein an equal number of said switches are in circuit connection with a first DC power rail and the remaining equal number of said switches are in circuit connection with a second DC power rail;
 ii. triggering means to properly sequence the firing of each switch to provide at least one output waveform from each inverter bridge, wherein each waveform is phase shifted;
 iii. a first transformer and a second transformer having primary windings in circuit connection with the output of each associated pair of said inverting bridges, said primary windings of said first transformer being in wye-connection, and said primary windings of said second transformer being in delta-connection; and
 iv. an individual secondary winding magnetically coupled with each of said primary windings, said secondary windings connected in a series-add connection,
whereby said AC voltage waveform consists of at least 24 steps per cycle;
wherein the improvement for compensating said multi-step AC power supply during a fault condition comprises:
c. sensing means to detect a short circuit within said semiconductors switches;
d. identifying means to identify a shortcircuited switch in a faulted inverter bridge;
e. disabling means to disable the switches within said faulted inverter bridge complementary to said short-circuited switch;
f. enabling means to enable the switches within said faulted inverter in circuit connection with the same DC power rail as said short-circuited switch;
g. adjusting means to adjust the firing sequence of the remaining semiconductors not in circuit connection with said faulted inverter bridge wherein the phase shift between the remaining healthy inverter bridges increases;
whereby said AC voltage waveform consists of at least 18 steps per cycle.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

This invention relates to a multi-step power inverter system that has many applications in AC power generation. See for example, U.S. Pat. No. 3,638,094. One such application is a variable speed constant frequency (VSCF) electrical power generator system used on military and commercial aircraft as is well known in the art, evidenced by U.S. Pat. Nos. 4,554,501 and 5,138,544, among others. For this reason, only a brief discussion will be set forth relating to the operation of a VSCF system. Furthermore, by way of example only, the components and principles of a 36-step wave inverter will be used to illustrate the invention. It will be understood, however, that the invention also applies to a 24-step wave inverter with limitations as discussed below.

Figure 1:
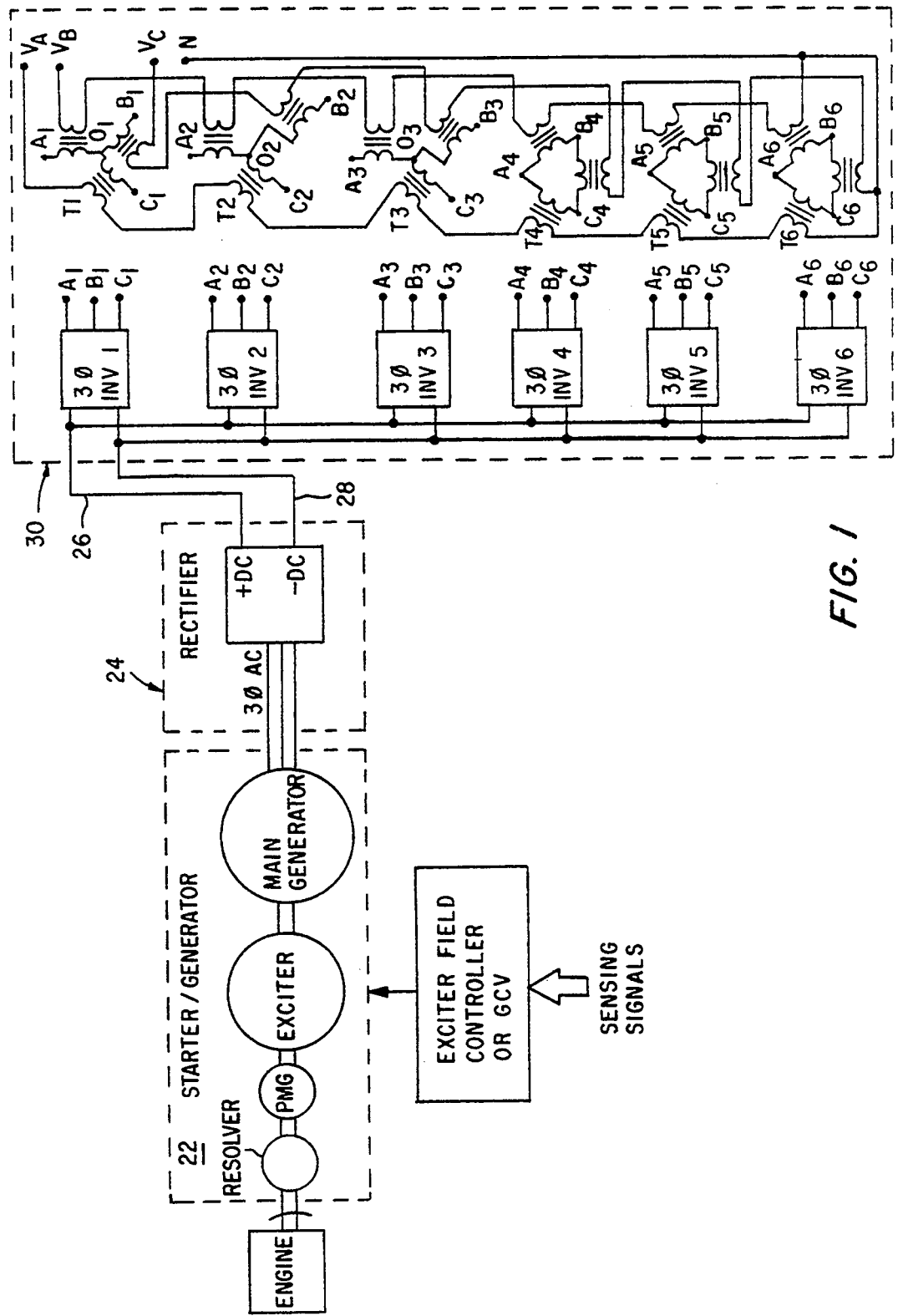
FIG. 1 is a block diagram of an exemplary 36-step wave inverter.

FIG. 1 is a schematic block diagram of a VSCF power system in accordance with one embodiment of the present invention. An output shaft of an aircraft engine 20 is mechanically coupled to a variable-speed AC generator 22, which in turn is electrically connected to an AC-to-DC rectifier bridge 24 to produce a DC voltage on DC-link conductors 26 and 28. An inverter system 30 receives DC voltage and produces a three-phase AC output on lines VA, VB and VC.

Figure 2:
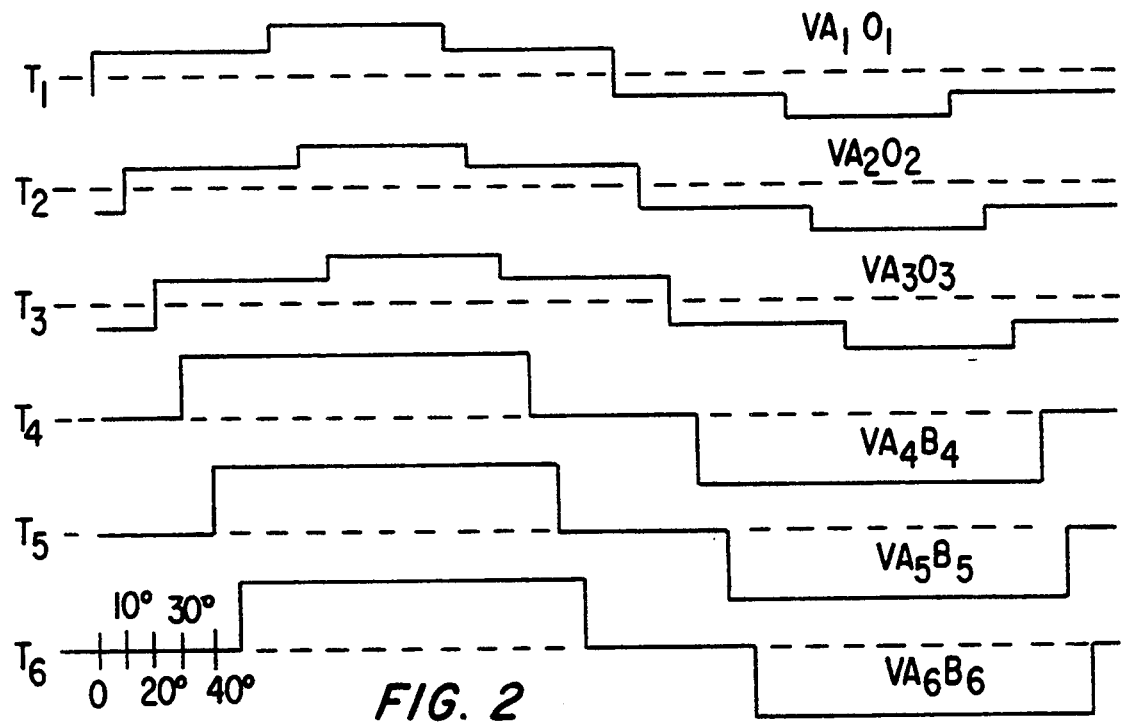
FIG. 2 is a graphical representation of the voltage waveforms measured at the primaries of the output transformers.
Figure 2A:
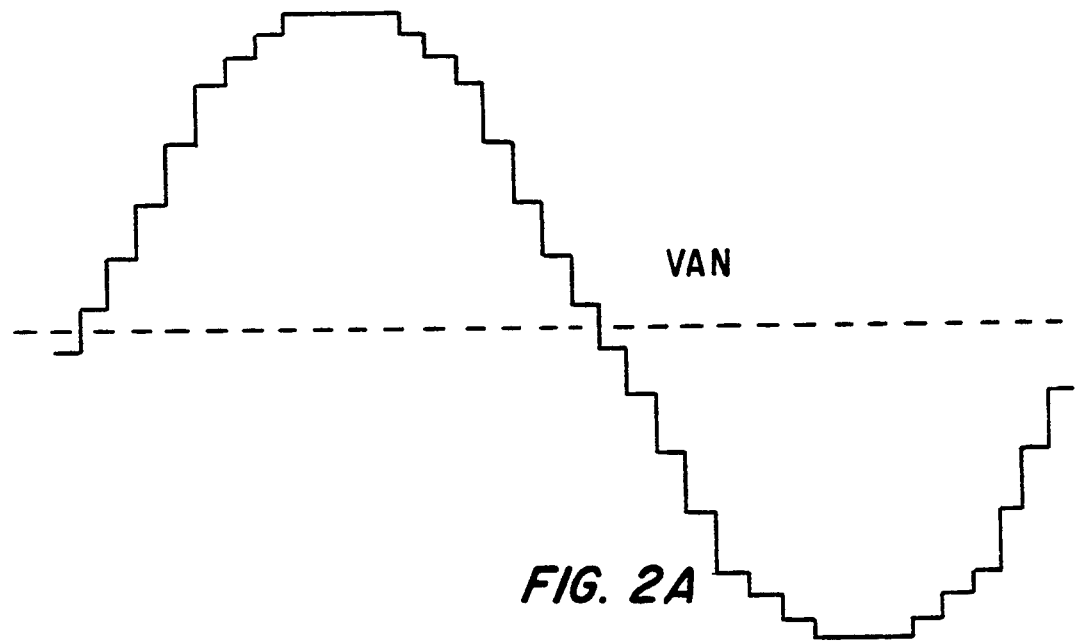
FIG. 2A is the resultant single-phase waveform of a 36 step-wave inverter corresponding to the waveforms of FIG. 2.

In the preferred embodiment, inverter system 30 comprises six identical inverter bridges INV1 through INV6. The output of the inverter bridges connect to six individual primaries of transformers T1 through T6. Inverters INV1, INV2 and INV3 connect to the primaries of T1, T2 and T3, respectfully, in a wye configuration. Inverters INV4, INV5 and INV6 connect to the primaries of T4, T5 and T6, respectfully, in a delta configuration. Alternate connection combinations are possible so long as an equal number of inverters connect to a wye and delta configuration. The secondaries of transformers T1 through T6 are common to all the primaries and are wound in a series-add configuration. The voltage waveforms for phase A, as measured at the primaries of transformers T1 through T6, and the resultant 36-step wave form are shown in FIGS. 2 and 2A, respectively. Voltage waveform $VA_1O_1$ leads voltage waveform $VA_2O_2$ by 10°, and $VA_2O_2$ leads $VA_3O_3$ by 10°, and so on. As is well-known in the art, the timing circuit that triggers each corresponding power switch to produce all appropriate phase shifts may be apart of a standard EPROM firing and logic control circuit 33. Table 1, below, is a Fourier Analysis of an ideal summation of the illustrated 36-step wave form. At full load, the 36 step waveform produces a sinewave with a total harmonic distortion (THID) of less than 0.5%.

The resultant outputs of phases B and C have the same voltage levels, but with corresponding phase shifts of 120° to produce a conventional three-phase power system. The result is a 36-step, three-phase quasi-sine wave.

Figure 3:
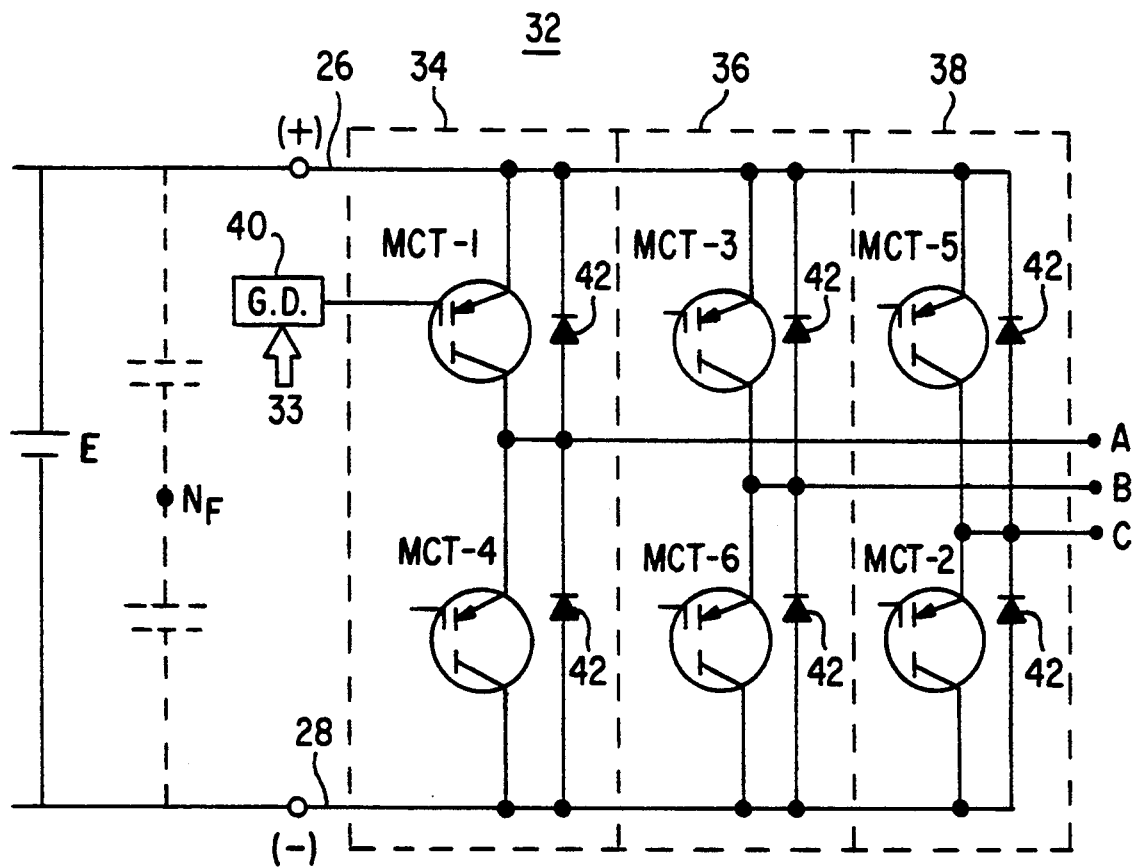
FIG. 3 is an electrical schematic of an inverter bridge.

Control of an inverter bridge during a fault occurrence is the focus of this invention and will be described in more detail. Referring now to FIG. 3, a typical inverter bridge 32 is illustrated. Inverter bridge 32 comprises three bridge legs 34, 36 and 38. Each bridge leg comprises a power switch electrically connected to (+)DC link 26 and a power switch electrically connected to (−)DC link 28. Preferably, in a VSCF application, the power switches are Mos-Controlled Thyristors (MCTs) because of their switching capabilities and load capacities. Bridge leg 34 corresponds to phase A, bridge leg 36 corresponds to phase B and bridge leg 38 corresponds to phase C. Each MCT has a control terminal connected to a gate driver 40 which is controlled by firing and logic control circuit 33. Additionally, each MCT has an associated free-wheeling diode 42 connected in parallel with the MCT. Free-wheeling diodes 42 conduct reactive load currents back to the respective DC bus, as is well known in the art.

Figure 3A:
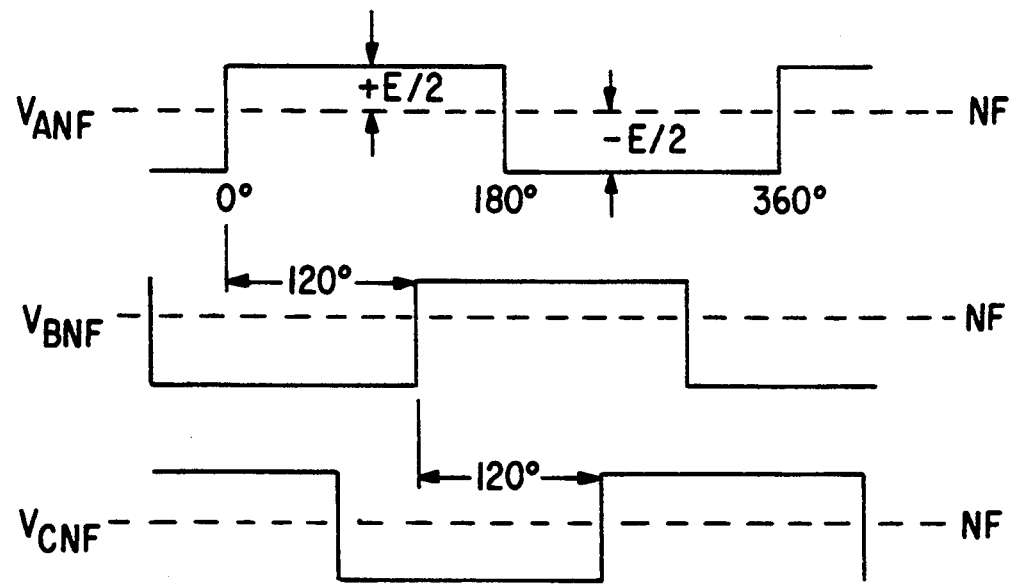
FIG. 3A is the resultant square-wave output for each phase shown in FIG 3.

The timing control of MCT-1 and MCT-4 of FIG. 3 is such that MCT-1 is turned on for 180° while MCT-4 is turned off during the same interval and vice versa. A dwell time is incorporated into the sequence timing logic such that sufficient time is allowed between one MCT turning off and its complement turning on. Using INV1 as an example, the resultant input $A_1$ (FIG. 1) to the primary winding of transformer T1 is an alternating voltage. The corresponding bridge legs associated with phase A of the other inverter bridges INV2 through INV6 have the same alternating voltage output, but offset from the previous corresponding bridge leg of phase A by 10°. The MCTs associated with phases B and C operate in the same manner, but the resultant alternating voltage input to the transformer primaries are each shifted 120° from the other phases, as shown in FIG. 3A.

Figure 4:
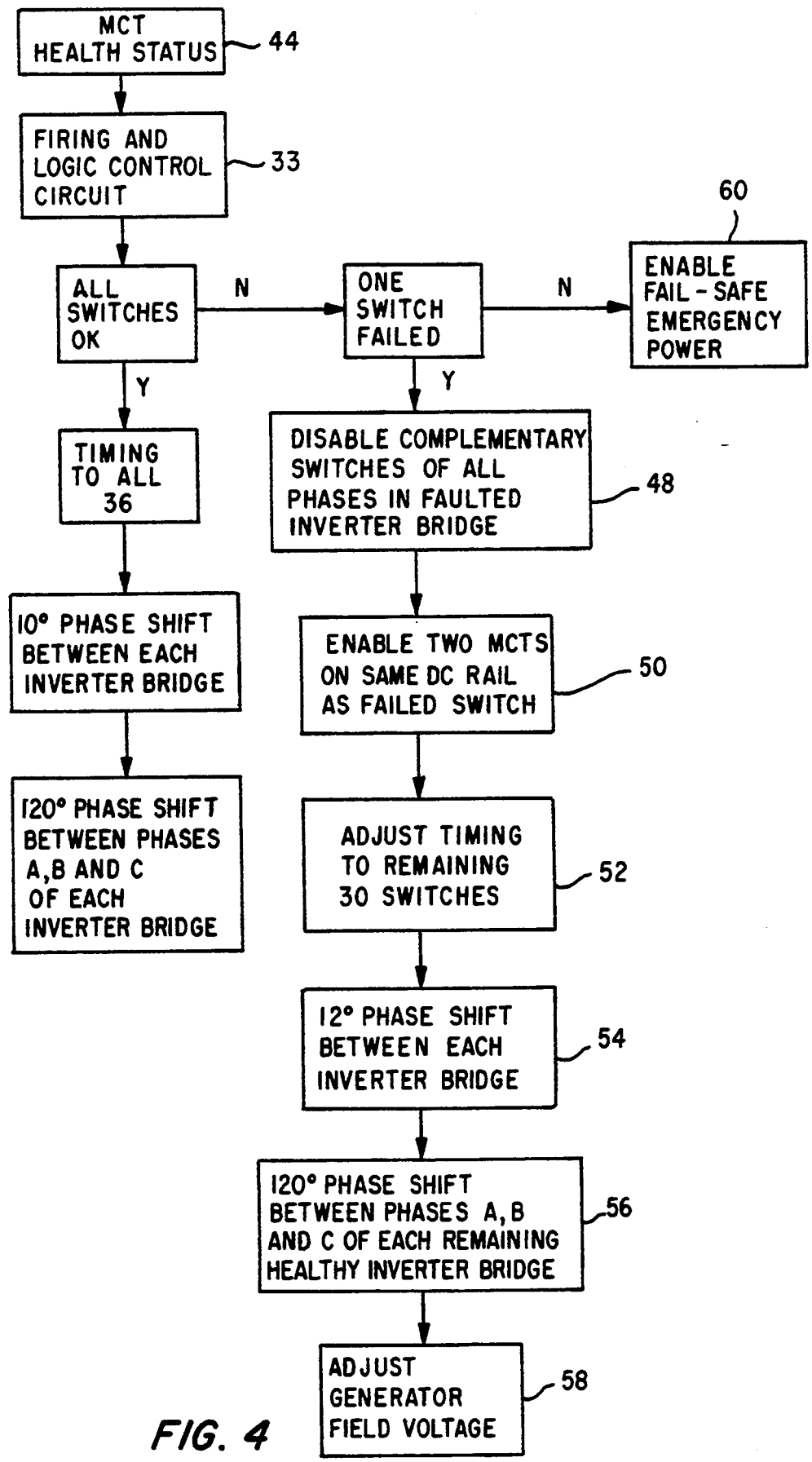
FIG. 4 is method flow diagram of the invention.

The method of the invention is such that when one MCT switch fails in any of the six inverter bridges, the VSCF will continue to operate without loss of AC power and with good power quality. MCT control circuit 33 controls the phase shift of each bridge leg according to the process summarized in FIG. 4. Control circuit 33 continually monitors the health status of each MCT 44. One method to sense the health of a MCT is through the use of an optical coupler connected to each MCT, as is known in the art. An optical coupler senses the voltage at the cathode of each MCT. Each optical coupler inputs a logic signal to the gate driver of the complementary MCT and to control circuit 33. When the optical coupler inputs a high signal, the gate driver of the complementary MCT is disabled to prevent the complementary MCT from turning on. If the optical coupler input remains high during its off cycle, the control circuit 33 proceeds to shut down the faulty bridge inverter.

By way of example, if MCT-1 of INV3 shorts out, control circuit 33 senses that particular MCT failure and proceeds to disable all complementary switches MCT-4, MCT-6 and MCT-2 in block 48. Control circuit 33 then instructs the appropriate gate drivers to continually energize MCT-3 and MCT-5 in block 50. Therefore, the output of INV3 on connection points $B_3$ and $C_3$ (FIG. 1) to the primary of T3 will be (+)DC link voltage 26. Since there is an absence of a fluctuating waveform at the primary of T3, no mutual inductance exists to produce an electromotive force in the secondaries associated with T3. Effectively, INV3 is no longer contributing to the resultant waveforms of phases A, B and C.

Figure 5:
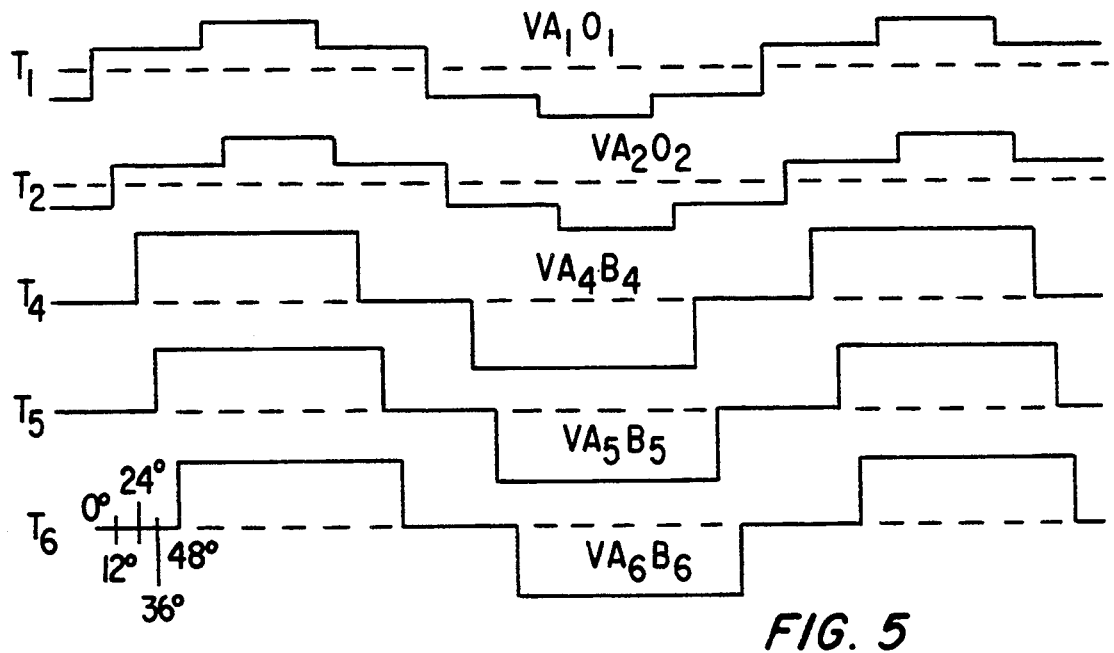
FIG. 5 is a graphical representation of the individual output voltage waveforms measured at the primary windings of the wye and delta transformers with one wye transformer shut down because of a fault in a power switch.
Figure 5A:
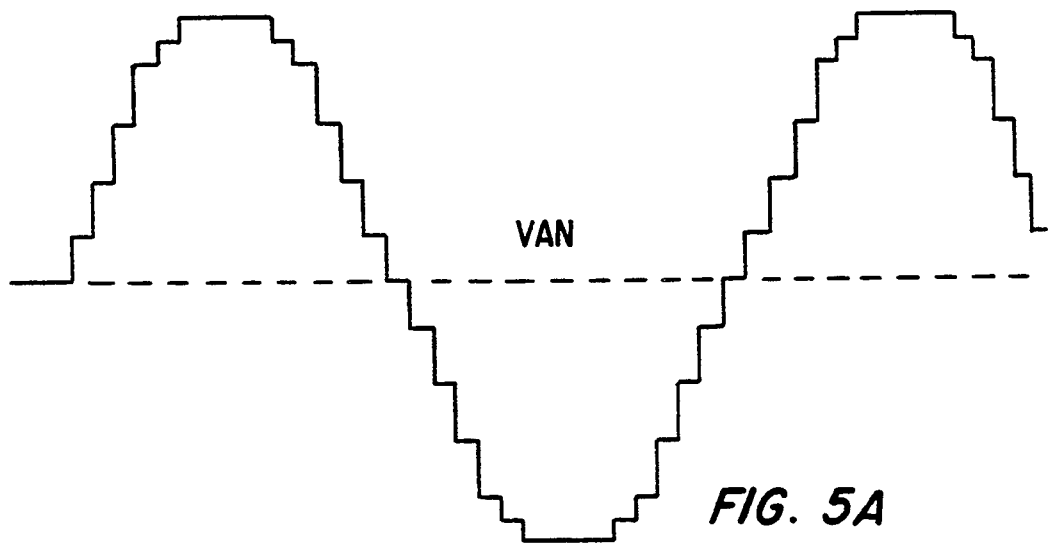
FIG. 5A is the resultant 30-step waveform due to a faulted power switch in FIG. 5.

The 30-step waveform is created by adjusting the firing timing of the remaining 30 active switches in block 52. The voltage waveforms for phase A as measured at the primaries of transformers T1, T2, T4, T5 and T6 and the resultant 30-step waveform are shown in FIGS. 5 and 5A, respectively. Voltage waveform $VA_1O_1$ now leads voltage waveform $VA_2O_2$ by 12°, and $VA_2O_2$ leads $VA_4O_4$ by 12°, and so on in block 54. Table 2, below, is a Fourier Analysis of the summation of a 30-step wave form. The result is a 30-step, three-phase quasi-sine wave. At full load the 30 step waveform produces a sinewave with a total harmonic distortion (THD) of less than 4.68%. As a result of the low harmonic distortion with the 30-step waveform, no additional filters are required in a standard VSCF power generation system.

The resultant outputs of phases B and C have the same voltage levels, but with a corresponding phase shift of 120°, block 56, to produce a known 3-phase power system.

The three phase inverter output will be 30 steps at 99 volts. The generator output voltage can be stepped up to increase the inverter output voltage, if required, by increasing the voltage of the generator field in block 58. The existing voltage regulator of the VSCF increases the generator field current accordingly to increase the DC voltage input to the inverter bridges.

If control circuit 33 senses more than one faulty MCT, the VSCF system shuts down and emergency electric power is provided by the fail-safe power system currently existing on the aircraft, block 60.

Figure 6:
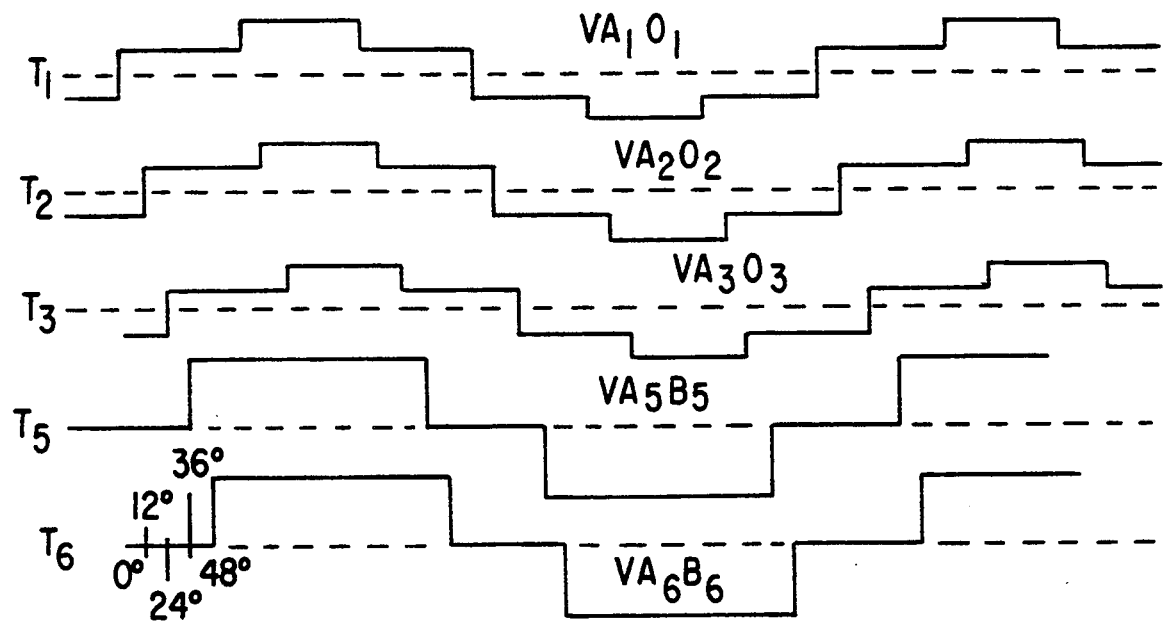
FIG. 6 is a graphical representation of the individual output voltage waveforms measured at the primary windings of the wye and delta transformers with one delta transformer shut down because of a fault in a power switch.
Figure 6A:
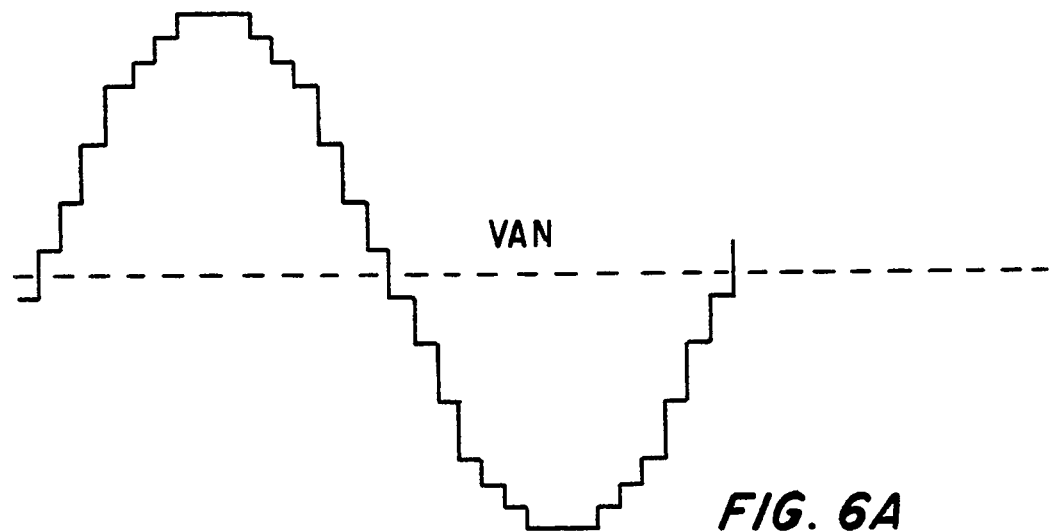
FIG. 6A is the resultant 30-step waveform due to a shut down transformer in FIG. 6.

FIGS. 6 and 6A illustrate the loss of a MCT associated with INV4 which connects to delta connected transformer T4. Control circuit 33 utilizes the same process logic, above, for this failure. Table 3, below, is a Fourier Analysis of a 30-step waveform as a result of a faulty delta connected transformer.

The method for compensating a faulted power switch may also be used in a 24-step inverter system. In this application, the invention generates an 18-step waveform. The phase shift of the individual waveforms of FIGS. 6 and 7 would now be 20°. In order to provide a quality alternating waveform, additional notch filters must be added to the system, as is known in the art. The three-phase output will be 18 steps at 90 volts. Generally, when a generator is properly sized for this application, the generator field voltage will not have enough adjustment capacity to bring the inverter output voltage back to 120 VAC. Accordingly, the generator would have to be oversized to adequately provide for a failed operation in a 24-step inverter using the invention.

TABLE 1

FOURIER ANALYSIS OF AN IDEAL SUMMATION

| Coefficient | Amplitude | Percentage |
| --- | --- | --- |
| 1 | 1.00000 | 100.000 |
| 11 | 0.00967 | 0.967 |
| 13 | 0.00740 | 0.740 |
| 23 | 0.00418 | 0.418 |
| 25 | 0.00426 | 0.426 |
| 35 | 0.02857 | 2.857 |
| 37 | 0.02703 | 2.723 |
| 47 | 0.00226 | 0.226 |
| 49 | 0.00196 | 0.196 |
| 59 | 0.00163 | 0.163 |
| 61 | 0.00174 | 0.174 |
| 71 | 0.01408 | 1.408 |
| 73 | 0.01370 | 1.370 |

TOTAL HARMONIC CONTENT = 4.617% (no load) 0.44% (full load)

TABLE 2

FOURIER ANALYSIS OF A 30-STEP WAVE

| Coefficient | Amplitude | Percentage |
| --- | --- | --- |
| 1 | 1.000 | 100.0000 |
| 11 | 0.008489 | 0.8489 |
| 13 | 0.005599 | 0.5599 |
| 23 | 0.001692 | 0.1692 |
| 25 | 0.002552 | 0.2552 |
| 29 | 0.029038 | 2.9038 |
| 31 | 0.026470 | 2.6470 |
| 47 | 0.002041 | 0.2041 |
| 49 | 0.001183 | 0.1183 |

TOTAL HARMONIC CONTENT = 4.68% (no load) 1.059% (full load)

TABLE 3

FOURIER ANALYSIS OF AN 30-STEP WAVE

| Coefficient | Amplitude | Percentage |
| --- | --- | --- |
| 1 | 1.0000 | 100.0000 |
| 11 | 0.0073 | 0.7300 |
| 13 | 0.006672 | 0.6672 |
| 29 | 0.027040 | 2.7040 |
| 31 | 0.027001 | 2.7001 |
| 35 | 0.000625 | 0.0625 |
| 37 | 0.001864 | 0.1864 |
| 47 | 0.000827 | 0.0827 |
| 49 | 0.002137 | 0.2137 |

TOTAL HARMONIC CONTENT = 4.67% (no load) 0.96% (full load)

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An multi-step, alternating current power supply having a failed-operation redundancy safety system comprising:
   a. an inverter for converting DC voltage to AC voltage, said inverter comprising:
      i. a multiple pair of inverter bridges, with each bridge having at least one pair of unidirectional conducting semiconductor switches, wherein an equal number of said switches are in circuit connection with a first DC power rail and the remaining equal number of said switches are in circuit connection with a second DC power rail;
      ii. triggering means to properly sequence the firing of each switch to-provide at least one output waveform from each inverter bridge, wherein each waveform is phase shifted;

iii. a first transformer and a second transformer in circuit connection with each pair of inverter bridges, said first and second transformer each having a primary and a secondary winding, said primary windings being in circuit connection with the output of each associated pair of said inverting bridges, said primary winding of said first transformer being in wye-connection, and said primary winding of said second transformer being in delta-connection; and iv. said secondary windings being magnetically coupled with associated said primary windings, said secondary windings connected in a series-add connection, whereby a phase shift between each inverter bridge is such that said AC voltage waveform consists of at least 24 steps per cycle;

wherein the compensation of said multi-step AC power supply during a fault condition comprises:

b. sensing means to detect a short circuit within said semiconductor switches;

c. identifying means to identify a short-circuited switch in a faulted inverter bridge;

d. disabling means to disable the switches within said faulted inverter bridge complementary to said short-circuited switch;

e. enabling means to enable the switches within said faulted inverter in circuit connection with the same DC power rail as said short-circuited switch;

f. adjusting means to adjust the firing sequence of the remaining semiconductors not in circuit connection with said faulted inverter bridge wherein said phase shift between each active inverter bridge increases;

whereby said AC voltage waveform consists of at least 18 steps per cycle.

2. An improved multi-step, alternating current power supply having a failed-operation redundancy safety system comprising:

a. an electrical generator electrically connected to rectifying means for producing a DC voltage;

b. regulating means to regulate said DC voltage at alternative voltage levels by controlling the output of said generator; and c. an inverter for converting said DC voltage to an AC voltage, said inverter comprising:

i. a multiple pair of inverter bridges, with each bridge having at least one pair of unidirectional conducting semiconductor switches, wherein an equal number of said switches are in circuit connection with a first DC power rail and the remaining equal number of said switches are in circuit connection with a second DC power rail;

ii. triggering means to properly sequence the firing of each switch to provide at least one output waveform from each inverter bridge, wherein each waveform is phase shifted;

iii. a first transformer and a second transformer having primary windings in circuit connection with the output of each associated pair of said inverting bridges, said primary windings of said first transformer being in wye-connection, and said primary windings of said second transformer being in delta-connection; and iv. an individual secondary winding magnetically coupled with each of said primary windings, said secondary windings connected in a series-add connection, whereby a phase shift between each inverter bridge is such that said AC voltage waveform consists of at least 24 steps per cycle;

wherein the improvement for compensating said multi-step AC power supply during a fault condition comprises:

d. sensing means to detect a short circuit within said semiconductor switches;

e. identifying means to identify a shortcircuited switch in a faulted inverter bridge;

f. disabling means to disable the switches within said faulted inverter bridge complementary to said short-circuited switch;

g. enabling means to enable the switches within said faulted inverter in circuit connection with the same DC power rail as said short-circuited switch;

h. adjusting means to adjust the firing sequence of the remaining semiconductors not in circuit connection with said faulted inverter bridge wherein said phase shift between each active inverter bridge increases;

whereby said AC voltage waveform consists of at least 18 steps per cycle.

3. The improved multi-step AC power supply of claim 2 wherein the sensing means is an optical coupler in circuit connection with each of said semiconductor switches.

4. The improved multi-step AC power supply of claim 2 wherein the identifying means, disabling means, enabling means and adjusting means are a function of an EPROM firing and logic control circuit.

5. The method of claim 2 wherein said inverter comprises 3 pair of inverter bridges and said AC voltage waveform comprises 36 steps per cycle.

6. The method of claim 5 wherein said phase shift between said inverter bridges increases from 10° to 12°.

7. The method of claim 2 wherein said inverter comprises 2 pair of inverter bridges and said AC voltage waveform comprises 24 steps per cycle.

8. The method of claim 7 wherein said phase shift between said inverter bridges increases from 15° to 20°.

9. A method for providing a failed-operation redundancy safety system in a multi-step, alternating current power supply comprising:

a. an electrical generator electrically connected to rectifying means for producing a DC voltage;

b. regulating means to regulate said DC voltage at alternative voltage levels by controlling the output of said generator; and c. an inverter for converting said DC voltage to an AC voltage, said inverter having:

i. a multiple pair of inverter bridges, with each bridge having at least one pair of unidirectional conducting semiconductor switches, wherein an equal nun%her of said switches are in circuit connection with a first DC power rail and the remaining equal number of said switches are in circuit connection with a second DC power rail;

ii. triggering means to properly sequence the firing of each switch to provide at least one output waveform from each inverter bridge, wherein each waveform is phase shifted;

iii. a first transformer and a second transformer having primary windings in circuit connection with the output of each associated pair of said inverting bridges, said primary windings of said first transformer being in wye-connection, and said primary windings of said second transformer being in delta-connection; and iv. an individual secondary winding magnetically coupled with each of said primary windings, said secondary windings connected in a series-add connection, whereby a phase shift between each inverter bridge is such that said AC voltage waveform consists of at least 24 steps per cycle; wherein the method comprises the steps:

d. sensing a short circuit fault in a power semiconductor;

e. identifying said faulted power semiconductor and faulted inverter bridge;

f. disabling the complementary power semiconductors of said faulted power semiconductor;

g. enabling said semiconductor switches connected to the same DC power rail as said faulted power semiconductor; and h. increasing said phase shift between each remaining active inverter bridge.

10. The method of claim 9 wherein said inverter comprises 3 pair of inverter bridges.

11. The method of claim 10 wherein said phase shift between said inverter bridges increases from 10° to 12°.

12. The method of claim 9 wherein said inverter comprises 2 pair of inverter bridges.

13. The method of claim 12 wherein said phase shift between said inverter bridges increases from 15° to 20°.

14. The method of claim 9 further comprising regulating the field voltage of said generator wherein said DC voltage increases.

* * * * *